United States Patent
Townsend et al.

[19]

[11] Patent Number: 5,974,562
[45] Date of Patent: *Oct. 26, 1999

[54] NETWORK MANAGEMENT SYSTEM EXTENSION

[75] Inventors: Robert L. Townsend, Sioux City, Iowa; Luo-Jen Chiang, Freehold, N.J.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/567,453

[22] Filed: Dec. 5, 1995

[51] Int. Cl.$^6$ .................................................. G06F 11/00
[52] U.S. Cl. ................................ 714/4; 714/12; 714/13; 709/218; 709/220
[58] Field of Search .................. 395/182.02, 182.08, 395/182.09, 182.1, 182.11, 200.01, 200.11, 200.51, 200.53, 200.54, 200.69, 200.68, 200.33, 200.47, 200.48, 200.49, 200.5; 370/216; 714/4, 10, 11, 12, 13; 709/203, 217, 218, 220, 238, 239

[56] References Cited

U.S. PATENT DOCUMENTS

| | | | |
|---|---|---|---|
| 4,412,281 | 10/1983 | Works ................................ | 395/182.02 |
| 5,027,269 | 6/1991 | Grant et al. ....................... | 395/182.02 |
| 5,148,433 | 9/1992 | Johnson et al. .................... | 395/182.08 |
| 5,168,443 | 12/1992 | McLaugghlin et al. ........... | 395/182.09 |
| 5,329,521 | 7/1994 | Walsh et al. ....................... | 395/182.02 |
| 5,331,631 | 7/1994 | Teraslinna ......................... | 395/182.02 |
| 5,408,649 | 4/1995 | Bershears et al. ................ | 395/182.08 |
| 5,473,599 | 12/1995 | Li et al. ............................. | 395/182.11 |
| 5,633,999 | 5/1997 | Clowes et al. ..................... | 395/182.04 |
| 5,661,719 | 8/1997 | Townsend et al. ................. | 370/216 |

OTHER PUBLICATIONS

Bhide et al., "Implicit Replication in a Network File Server", IEEE, pp. 85–90, Mar. 1990.

Bhide et al., "A Highly Available Network File Server", USENIX, pp. 199–205, 1991.

*Primary Examiner*—Dieu-Minh T. Le
*Attorney, Agent, or Firm*—Ying Tuo; Kenneth M. Berner

[57] ABSTRACT

A network management system includes a main network management station and a backup network management station. Different physical and logic addresses are assigned to the two stations. The data packet(s) containing network management information has/have the physical and logical addresses assigned to the main network management station. Thus, only the main network management station can receive the data packet(s) containing network management information when it is in a proper operational condition. When the main network management station is about to fail, a packet (or packets) containing operational status information is/are sent to the backup network management work station, via a network. Upon receiving the operational status information, the physical and logical addresses assigned to the backup network management work station is modified as the physical and logical addresses assigned to the main network management station. Thus, the backup network management station can receive the data packet(s) containing the network management information after the main network management station has failed.

18 Claims, 6 Drawing Sheets

NETWORK MANAGEMENT SYSTEM EXTENSION

BACKGROUND OF THE INVENTION

This invention generally relates to network management systems, and more particularly to a network management system having more than one network management work station with at least one of which being used as a backup management work station that may remotely communicate with a main network management station.

In selecting a specific type of computer system for a network management system, reliability is a key concern.

Usually, a smaller computer system, such as SUN Sparc work station, HP 3000 work station or AT&T GIS 3350 work station, is less reliable than a larger computer system, such as HP 9000 computer or IBM 3090 computer, because a smaller computer system may lack built-in redundancy features.

To enhance the reliability when small computers are used, network management systems store data in Redundant Array Inexpensive Disks (RAID), where several inexpensive disks contain the same data and operate in parallel fashion. In operation, even if one or more inexpensive disks fail, the network management systems can still properly function.

To further enhance the reliability, more than one network management station can be connected to the RAID.

Figure 1:
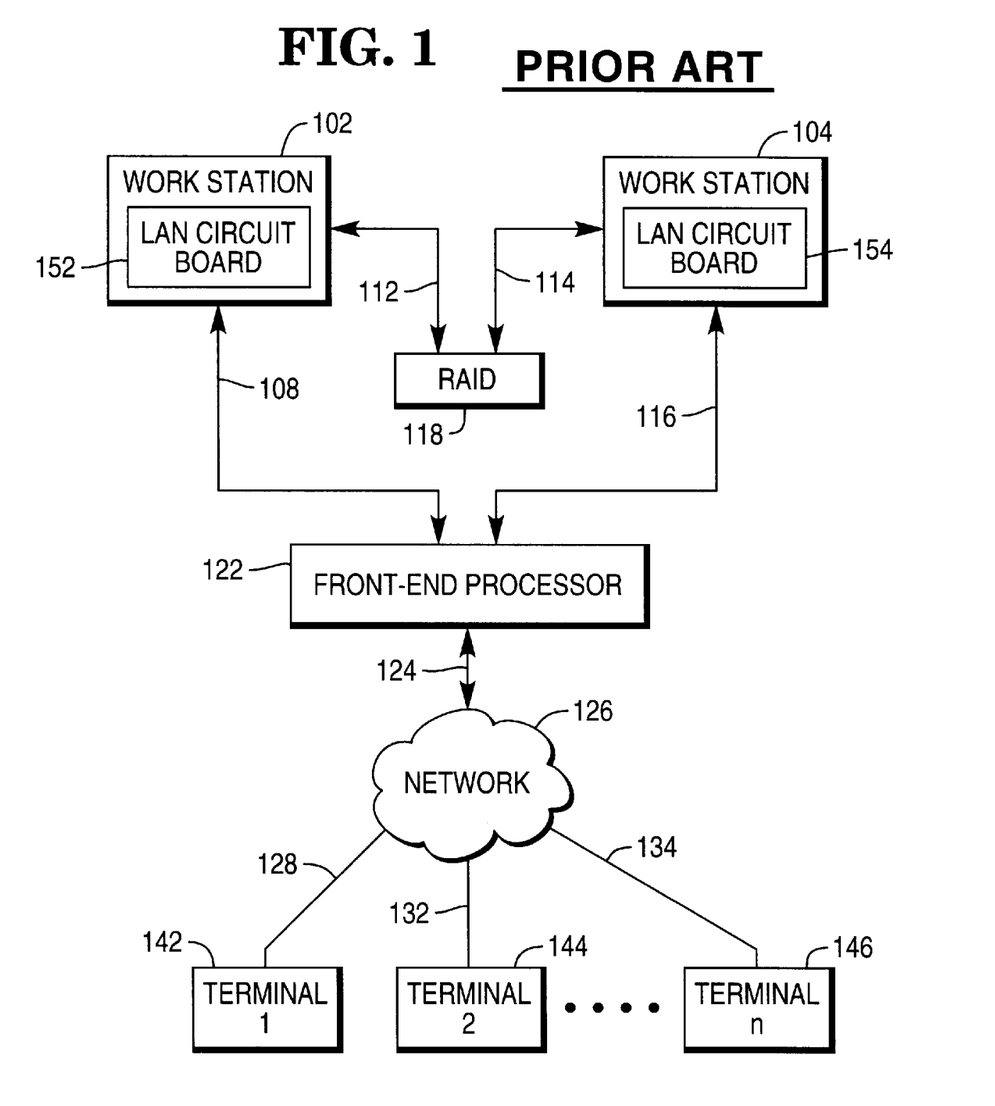
FIG. 1 depicts a conventional network management system.

FIG. 1 depicts a network management system including work stations 102 and 104, RAID 118, and front-end processor 122. Work stations 102 and 104 are connected to RAID 118 and front-end processor 112. Terminals 1–n are connected to network 126 and able to send data packets to station 102 or 104 via front-end Processor 122. Work station 102 or 104 can receive and store incoming data packets into RAID 118.

In operation, work station 102 can be chosen to serve as a main network management station, and work station 104 as a backup network management work station. When work station 102 is in proper operational condition to receive the incoming data packets containing network management information, it is not desirable for station 104 to receive the same incoming data packets, since the network management system requires only a single control station to collect and store the necessary network management information. Thus, front-end processor 122 can be used to direct incoming data packets containing network management information from network 126 to work station 102 when the station is in proper operational condition. Front-end processor 122 switches the incoming data packets containing network management information to work station 104 when work station 102 fails. By using work station 102 as the backup network management station, the reliability of the network management system is improved.

One disadvantage of the scheme shown in FIG. 1 is that a front-end processor is needed, which can be relatively expensive. For example, the current price of a typical front-end processor IBM 3780 is around 100 thousand US dollars.

Another disadvantage of the scheme shown in FIG. 1 is that each of the incoming data packets containing network management information has to be switched by the front-end processor, thus slowing data transmission speed.

The invention reflected in U.S. Pat. No. 5,661,719, filed on Oct. 19, 1995 and entitled METHOD FOR ACTIVATING A BACKUP NETWORK MANAGEMENT STATION IN A NETWORK MANAGEMENT SYSTEM, can overcome these two disadvantages. Applicants incorporate this patent into the present application by reference.

Figure 2:
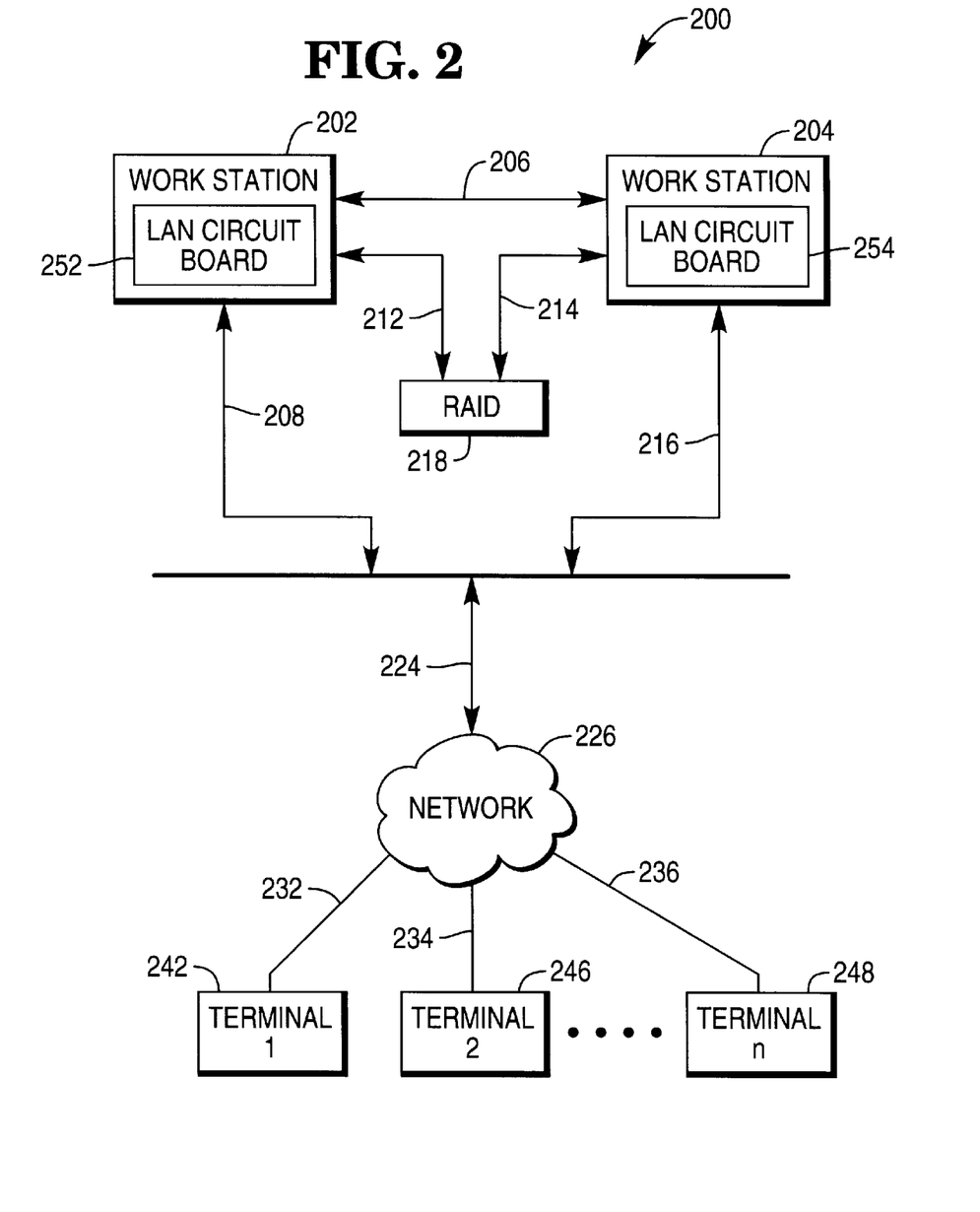
FIG. 2 depicts a network management system that can overcome the disadvantages in the network management system shown in FIG. 1.

FIG. 2 depicts a network management system (200) that can overcome the two disadvantages in the scheme shown in FIG. 1.

As shown in FIG. 2, the network management system includes work station 202 (chosen as a main network management station) and work station 204 (chosen as a backup network management station). Being both connected to RAID 218, work stations 202 and 204 can both get access to RAID 218. The data packets from terminals 1–n can be simultaneously delivered to work stations 202 and 204 via link 224.

When work station 202 is in proper operational condition, work station 204 is set in an inactive mode. Thus, even the data packets from Terminals 1–n are simultaneously delivered to work stations 202 and 204 via network 326, only work station 202 acts upon the incoming data packets with the IP and MAC addresses matching these assigned to work station 202.

When work station 202 is about to fail, a fault condition signal is sent from work station 202 to work station 204 via physical link 206. The fault condition signal invokes a routine (which can be stored in station 204) to set network management station 204 in an active mode. Thus, after work station 202 has failed, work station 204 will act upon the incoming data packets with the IP and MAC addresses matching these that have been assigned to station 202.

One disadvantage in the scheme shown in FIG. 2 is that there requires a physical link between the main network management station and the backup network management station. Especially when the two network management stations are located in two remote sites, the physical link may entail a substantial cost for installation and materials.

Therefore, there has been a need to provide a reliable network management system with reduced cost and improved speed.

SUMMARY OF THE INVENTION

In one aspect, this invention provides a novel method in using with a network management system for managing a network. The network management system includes a first station and a second station. The method includes the steps of:

(A) when said first station is in proper operational condition:
   (i) setting said first and second station with different identifications;
   (ii) sending data containing network management information to said first station; and
(B) when said first station is about to fail:
   (i) re-setting said second station with the identification that has been assigned to said first station;
   (ii) sending said data containing network management information to said second station.

In another aspect, this invention provides a novel network management system for managing a network. The network management system includes a first station and a second station. The network management system includes:

(A) when said first station is in proper operational condition:
   (i) means for setting said first and second station with different identifications;
   (ii) means for sending data containing network management information to said first station; and
(B) when said first station is about to fail:
   (i) means for re-setting said second station with the identification that has been assigned to said first station;

(ii) means for sending said data containing network management information to said second station.

It is accordingly an objective of the present invention to provide a reliable network management system without imposing an undue cost.

It is another objective of the present invention to provide a reliable network management system with improved data transmission speed.

BRIEF DESCRIPTION OF THE DRAWING

The features and advantages of the present invention will become apparent to those skilled in the art to which the invention relates from the subsequent description of the preferred embodiments and the appended claims, in conjunction with the accompanying drawing in which:

DETAILED DESCRIPTION OF PREFERRED EMBODIMENTS

Figure 3:
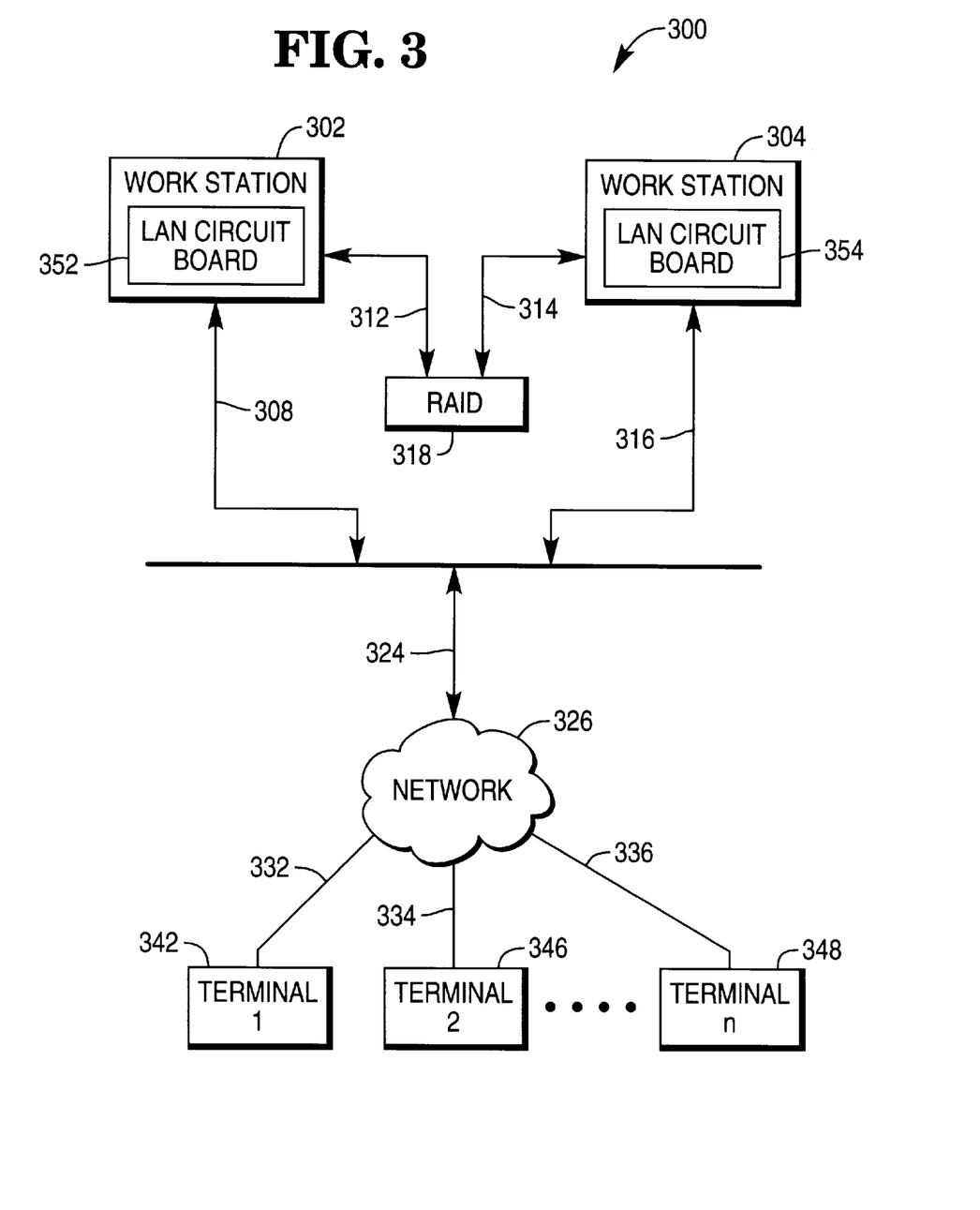
FIG. 3 depicts a network management system, in accordance with the present invention.

FIG. 3 depicts network management system 300, in accordance with the present invention, which includes work stations 302 and 304, disk storage (RAID) 318, network 326, and terminals 1–n.

Work stations 302 and 304 include LAN circuit boards 352 and 354, respectively. Through their correspondent LAN circuit boards 352 and 354, work stations 302 and 304 can communicate with network 326, via lines 308 and 316 respectively.

Since work stations 302 and 304 are connected to disk storage (RAID) 318 via lines 312 and 314 respectively, they can both get access to disk storage (RAID) 318. Work stations 302 and 304 are also connected to network 326, via lines 308 and 316 respectively.

Being connected to network 326 via lines 332, 334 and 336 respectively, terminals 1–n can send data packets to work stations 302 and 304, via network 326.

Figure 3A:
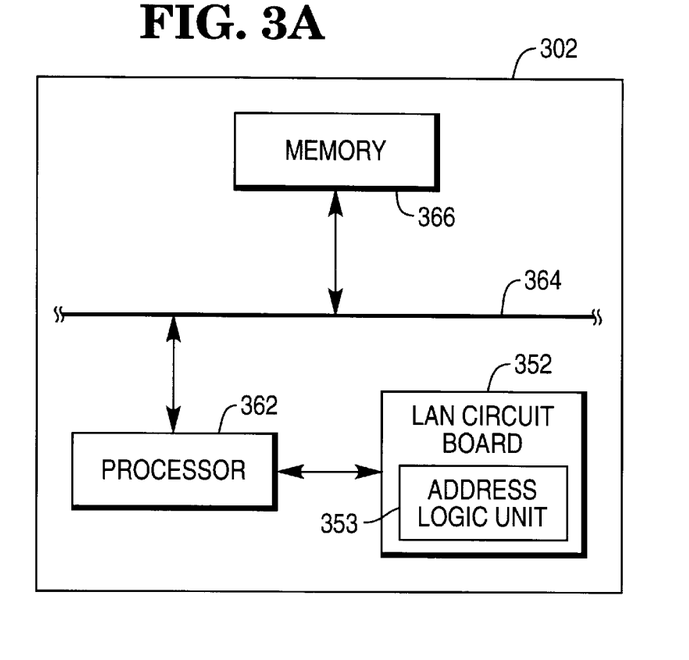
FIGS. 3A and 3B depict work stations 302 and 304 shown in FIG. 3 respectively in greater detail, in accordance with the present invention.
Figure 3B:
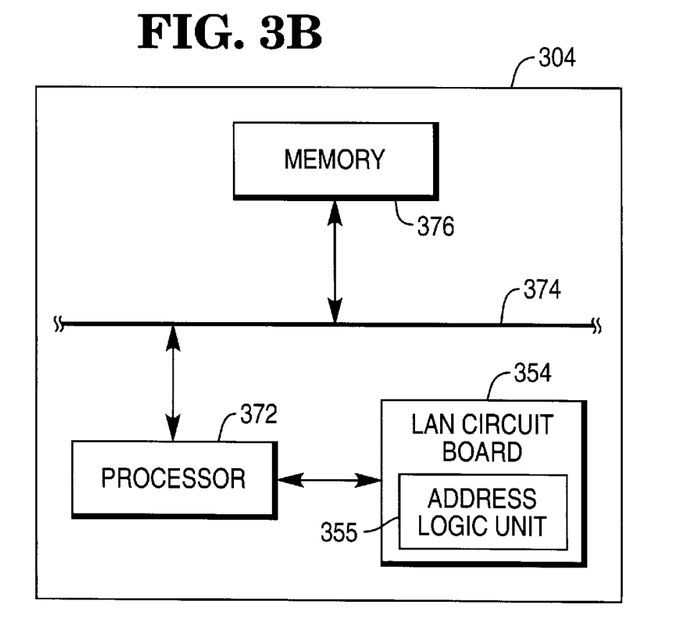

FIGS. 3A and 3B depict work station 302 and work station 304 in greater detail, respectively.

As shown in FIG. 3A, work station 302 includes LAN circuit board 352, processor 362, bus 364, and memory 366. Processor 362 and memory 366 are both coupled to bus 364, so that processor 362 can get access to memory 366.

Similarly, as shown in FIG. 3B, work station 304 includes LAN circuit board 354, processor 372, bus 374, and memory 376. Processor 372 and memory 376 are both coupled to bus 374, so that processor 372 can get access to memory 376.

Accordingly, processors 362 and 372 can carry out the programs storied in memories 366 and 376, respectively.

As shown in FIGS. 3A and 3B, LAN circuit boards 352 and 354 respectively contain address logic units 353 and 355. The address logic units can define and identify the IP address and MAC address for the correspondent work stations 302 and 304 (where IP stands for Internet Protocol, and MAC stands for Medium Access Control). A work station acts upon an incoming data packet when both the destination IP address and destination MAC address in the data packet match the IP address and MAC address assigned to the work station (302 or 304).

LAN circuit boards 352 and 354 are coupled to processors 362 and 372 respectively, so that processors 362 and 372 can control the operation of their respective LAN circuit board 352 or 354.

Figure 4:
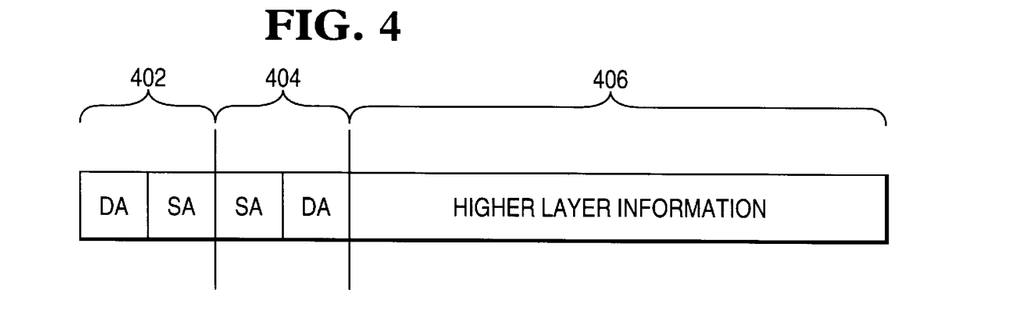
FIG. 4 depicts the format of a typical data packet.

FIG. 4 depicts the format of a typical data packet, including: MAC address section 402 containing destination address (DA) and source address (SA); IP address section 404 containing source address (SA) and destination address (DA); and higher layer information 406, such as E-mail or file transfer carried by TCP (Transmission Control Protocol). The MAC addresses identify the physical addresses of sources and destinations for work stations connected to the network. And the IP addresses identify the logical addresses of sources and destinations for work stations connected to the network.

The IP address is managed by the network administrator on behalf of the users.

The MAC address can be pre-configured on a LAN circuit board, and it can also be modified by software.

Both IP and MAC addresses can be modified by the networking administration instructions, such as ifconfig instruction.

Ifconfig instruction is used to assign an address to a network interface and/or to configure network interface parameters. Ifconfig instruction has two formats as follows.

Format I:
ifconfig interface [address_family] [address [dest_address]]
[parameters] [netmask mask]
[broadcast address] [metric n]; and
Format II:
ifconfig interface [protocol family]

Ifconfigure instruction can be used at boot time to define the network address of each interface present on a machine; it may also be used at a later time to redefine an interface's address or other operating parameters. The interface parameter is a string of the form name unit, for example "end 1."

Since an interface may receive transmissions in differing protocols, each of which may requires separate naming schemes, the parameters and addresses are interpreted according to the rules of some address family, specified by the address family parameter. The address families currently supported are ether and inet.

For the DARPA (Defense Advanced Research Projects Agency) Internet family (inet), the address is either a host name present in the host name data base, or a DARPA Internet address expressed in the Internet standard dot notation. A typical Internet address is 192.9.200.44, where 192.9.200 is the network number and 44 is the machine's host number.

For the ether address family, the address is an Ethernet address represented as x:x:x:x:x:x, where x is a hexadecimal number between 0 and ff.

If the dest_address parameter is supplied in addition to the address parameter, it specifies the address of the correspondent on the other end of a point to point link.

Referring back to FIG. 3, work station 302 can be chosen as a main network management station, and work station 304 as a backup network management station. The two work stations have different IP and MAC addresses. The data packets containing network management information have the IP and MAC addresses that are assigned to work station 302.

Therefore, when work station 302 is in proper operational condition, only station 302 can receive the data packets containing network management information via network 326, while work station 304 can receive the incoming data packets with IP and MAC addresses matching the addresses assigned to it.

Acting as the main network management station, work station 302 receives and stores the incoming data packets containing network management information into disk storage (RAID) 318. However, both stations 302 and 304 can get access to disk storage (RAID) 318 and control network management system.

When work station 302 is about to fail, a failure routine will be invoked to modify the IP and MAC addresses on LAN circuit board 354 to the IP and MAC addresses that have been assigned work station 302. The failure routine also informs network 326 such address modification, so that the data packet(s) containing network management information will be delivered to work station 304. After work station 302 has failed, work station 304 can receive the data packets containing network management information and store them into disk storage (RAID) 318.

Figure 5A:
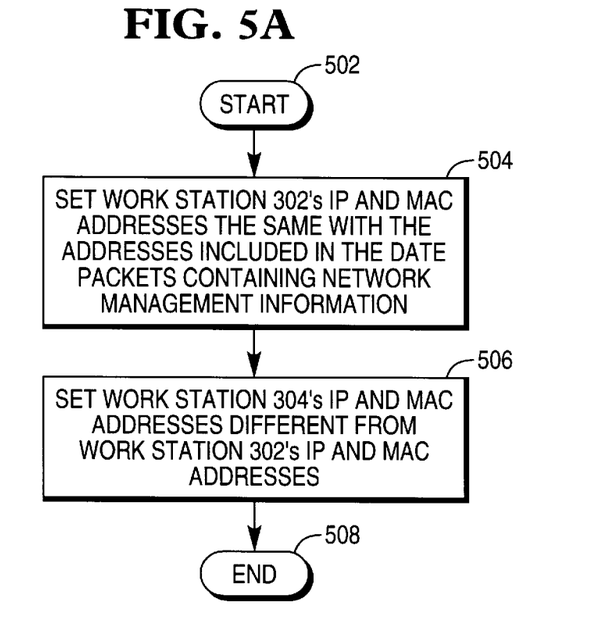
FIG. 5A depicts a flowchart showing the operation when the main network management station is in a proper operational condition, in accordance with the present invention.

FIG. 5A depicts a flowchart, showing the operation work station 302 is in a proper operational condition, in accordance with the present invention.

In FIG. 5A, step 504 sets the IP and MAC addresses of work station 302 (shown in FIG. 3) the same with the addresses included in the data packets containing network management information.

Thus, in the proper operational condition, work station 302 can receive the data packets containing network management information and store them in disk storage (RAID) 318 (shown in FIG. 3).

Step 506 sets work station 304's IP and MAC addresses different from the IP and MAC addresses of work station 302 (shown in FIG. 3).

Thus, in the proper operational condition, work station 304 will not receive the data packets containing network management information, while it can receive the data packets with the IP and MAC addresses matching the addresses assigned to it.

As mentioned in the above, in the proper operational condition, both work stations 302 and 304 can get access disk storage (RAID) 218 and control the network management system.

Figure 5B:
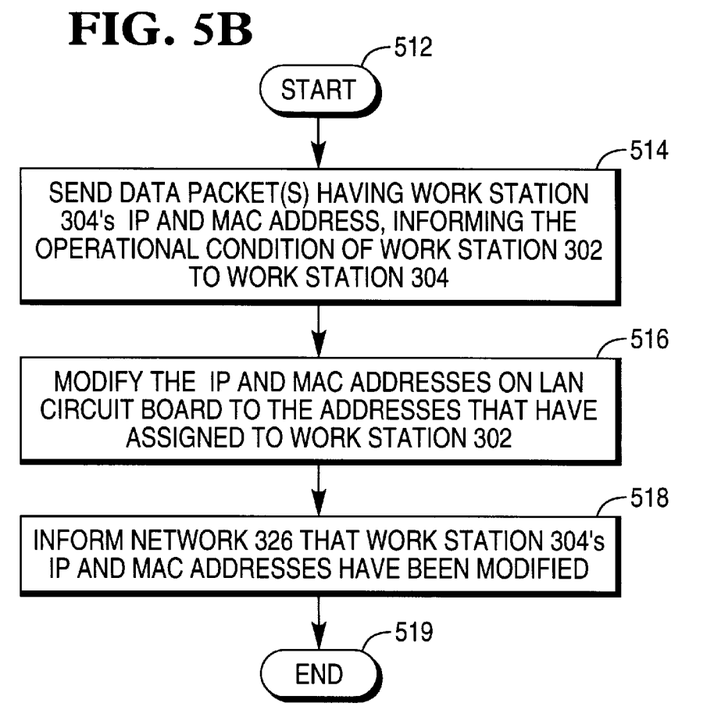
FIG. 5B depicts a flowchart showing the operation when the main network management station is about to fail, in accordance with the present invention.

FIG. 5B depicts a flowchart, showing the operation when work station 302 is about to fail, in accordance with the present invention.

In FIG. 5B, when work station 302 is about to fail, step 514 invokes a failure routine stored in work station 302, such as the PANIC routine in UNIX operating system, to generate a data packet (or data packets) containing the operational status of work station 302 and send the data packet (or data packets) to network 326. The data packet (or data packets) contain(s) the IP and MAC address assigned to work station 304. Network 326 delivers the data packet (or data packets) to work station 304.

Upon receiving the data packet (or data packets) containing the operational status of work station 302, step 516 invokes a routine to modify the IP and MAC addresses on LAN circuit board 354 to the addresses that have assigned to work station 302, using the ifconfig instruction.

After the IP and MAC addresses on LAN circuit board have been modified, work station 304 can receive the data packets containing network management information and store the incoming data packets into disk storage (RAID) 218.

Step 518 informs network 326 that work station 304's IP and MAC addresses have been changed, so that network 326 will deliver the data packet containing network management information to work station 304 via link 316.

Figure 5C:
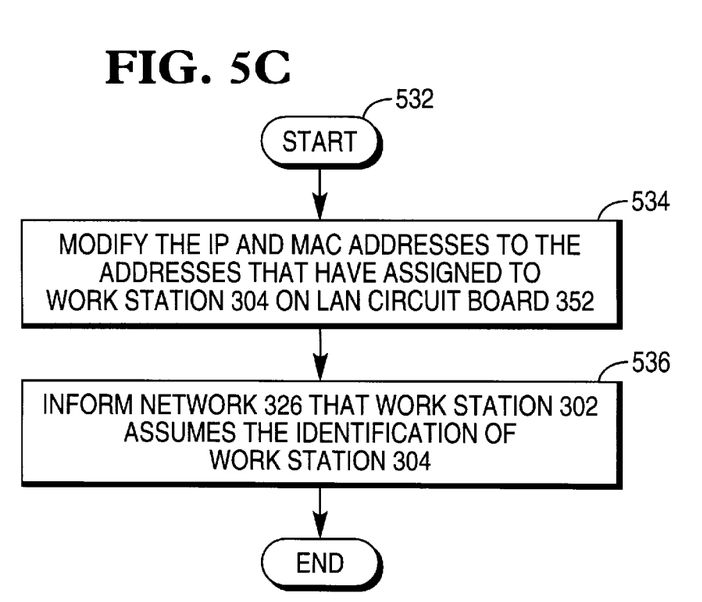
FIG. 5C depicts a flowchart showing the operation when the main network management station is recovered from the failure.

FIG. 5C depicts a flowchart, showing the operation when work station 302 is recovered from failure, in accordance with the present invention.

After work station 302 is recovered from failure, step 534 invokes a routine stored in work station 302 to modify the IP and MAC addresses to the addresses that have assigned to work station 304 on LAN circuit board 352.

Step 536 informs network 326 that work station 302 assumes the identification of work station 304.

If work station 304 is about to fail, a failure routine stored in work station 304 will be invoked to perform the similar steps as shown in FIG. 5B:

(1) generating a data packet (or data packets) containing the operational status of work station 304, and sending the data packet(s) from work station 304 to work station 302 via network 326;

(2) invoking a routine stored in work station 302 to modify the IP and MAC addresses on LAN circuit board 352 back to the addresses that have originally assigned to work station 302; and (3) informing network 326 that work station 302 has resumed it original IP and MAC addresses.

It should be noted that the identification process of the network management station that receives and processes network management information is the same, no matter which specific work station actually performs such function.

Thus, the programs and routines can be stored in both memories 366 and 376 (shown in FIGS. 3A and 3B). Processors 362 and 372 can execute the programs and routines stored in the respective memory (362 or 372) to perform the steps shown in FIGS. 5A–5C.

It should be appreciated that, in setting up the backup network management station to process the data packet(s) containing network management information, the present invention provides a novel method to use features in existing network management software. Specifically, the present invention creatively uses: (1) the failure routine in existing operating system, (2) the software-configurability of the MAC and IP addresses on existing LAN circuit board, and (3) ifconfig contained in existing network administration instructions.

As such, the present invention provides a cost-effective solution, because the activating of a backup network management station can be implemented by few additional instructions without adding extra hardware.

The present invention also provides fast data packet communication, because the front-end processor (as shown in FIG. 1) is eliminated in the data packet transmission path.

The present invention further eliminates the physical link (link 206 shown in FIG. 2) for transmitting the operational status information between the main network management station and the backup network management station.

One advantage of the present invention is to provide redundancy of the network management station without imposing undue hardware and software overhead.

The approach of the present invention is very useful in the situations (banking and financial environments, for example) where the continuing and non-disruptive monitoring of network operations is extremely important, but economy is sometimes also consideration and limitation.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A method of using a network management system for managing a network, the network management system including a first station having a first identification unique to the first station and a second station having a second identification unique to the second station, the first station and the second station each connected to each other via the network and each connected to a storage device, the method comprising the steps of:

delivering data frames to the first and second stations, each of the data frames including the first identification assigned to the first station;

when the first station is in proper operational condition, setting the first station with the first identification and the second station with the second identification; routing the data frames including the first identification to the first station for processing and for storing some of the data frames in the storage device so that the second station does not receive and process the data frames;

when the first station is about to fail, re-setting the second station with the first identification; and routing the data frames including the first identification to the second station for processing and for storing at least some of the data frames in the storage device;

wherein the data frames are delivered to the first and second stations through a first interface and a second interface, respectively;

the first station is set with the first identification using the first interface and the second station is set with the second identification using the second interface; and the second station is reset with the first identification using the second interface.

2. The method of claim 1, further comprising the step of:
    re-setting the first station with the second identification that has been assigned to the second station when the first station is recovered from a failure.

3. A method of using a network management system for managing a network, the network management system including a first station having a first logic and physical address unique to the first station and a second station having a second logic and physical address unique to the second station, the first station and the second station each connected to each other via the network and each connected to a storage device, the method comprising the steps of:

delivering data frames to the first and second stations when the first station is in proper operational condition, each of the data frames containing the first logic and physical addresses;

when the first station is in proper operational condition, setting the first station with the first logic and physical addresses and the second station with the second logic and physical addresses;

routing the data frames including the first logic and physical addresses to the first station for processing and for storing at least some of the data frames in the storage device so that the second station does not receive and process the data frames;

when said first station is about to fail re-setting the second station with the first logic and physical addresses; and routing the data frames including the first logic and physical address to the second station for processing and for storing at least some of the data frames in the storage device;

wherein the data frames are delivered to the first and second stations through a first interface and a second interface, respectively;

the first station is set with the first logic and physical addresses using the first interface and the second station is set with the second logic and physical addresses using the second interface; and the second station is reset with the first logic and physical addresses using the second interface.

4. The method of claim 3, wherein the logical address is defined by an IP address and the physical address is defined by a MAC address.

5. The method of claim 3, further comprising the step of:
    re-setting the first station with the second logical and physical addresses that have been assigned to the second station when the first station is recovered from a failure.

6. A method of using a network management system for managing a network, the network management system including a first station having a first identification unique to the first station and a second station having a second identification unique to the second station, the first station and the second station each connected to each other via the network and each connected to a storage device, the method comprising the steps of:

delivering data frames to the first and second stations, each of the data frames including the first identification;

when the first station is in proper operational condition, setting the first station with the first identification and the second station with the second identification;

routing the data frames including the first identification to the first station for processing and for storing at least some of the data frames in the storage device, and the second station does not receive and process the data frames; and when the first station is about to fail, sending a data frame via the network including the second identification and operational condition of the first station to the second station;

at the second station, via the network, receiving the data frame including the operational condition of the first station;

at the second station, in response to the operational condition the first station included in the data frame, re-setting the second station with the first identification, so that the second station receives, processes and stores the data frames including the first identification in the storage device;

wherein the data frames are delivered to the first and second stations through a first interface and a second interface, respectively;

the first station is set with the first identification using the first interface and the second station is set with the second identification using the second interface; and the second station is reset with the first identification using the second interface.

7. The method of claim 6, further comprising the steps of:
re-setting the first station with the second identification that has been assigned to the second station when the first station is recovered from a failure.

8. A method of using a network management system for managing a network, the network management system including a first station having a first identification unique to the first station and a second station having a second identification unique to the second station, the first station and the second station each connected to each other via the network and each connected to a storage device, the method comprising the steps of:

connecting the first station to the network via a first link and the second station to the network via second link;

delivering data frames to said first and second links, each of the data frames including the first identification;

when the first station is in proper operation condition, setting the first station with the first identification and the second station with the second identification so that the first station receives, processes and stores the data frames including the first identification in the storage device, and the second station does not receive and process the data frames;

when the first station is about to fail, sending a data frame via the network including the second identification and operational condition of the first station to the second station;

at the second station, via the network, receiving the data frame including the operational condition of the first station;

at the second station, in response to the operational condition included in the data frame, re-setting the second station with the first identification, so that the second station receives, processes and stores the data frames including the first identification in the storage device;

wherein the data frames are delivered to the first and second stations through a first interface and a second interface, respectively;

the first station is set with the first identification using the first interface and the second station is set with the second identification using the second interface; and the second station is reset with the first identification using the second interface.

9. The method of claim 8, further comprising the step of:
re-setting the first station with the second identification that has been assigned to the second station when the first station is recovered from a failure.

10. A network management system for managing a network, the network management system including a first station having a first identification unique to the first station and a second station having a second identification unique to the second station the first station and the second station each connected to each other via the network and each connected to a storage device, the system comprising;

means for delivering data frames to the first and second stations, each of the data frames including the first identification assigned to the first station;

means for setting the first station with the first identification and second station with the second identification when the first station is in proper operational condition; and means for re-setting the second station with the first identification that has been assigned to the first station, so that the second station receives, processes and stores the data frame including the first identification in the storage device when the first station is about to fail;

wherein the data frames are delivered to the first and second stations through a first interface and a second interface, respectively;

the first station is set with the first identification using the first interface and the second station is set with the second identification using the second interface; and the second station is reset with the first identification using the second interface.

11. The network management system of claim 10, further comprising:

means for re-setting the first station with the second identification that has been assigned to the second station when the first station is recovered from the failure.

12. A network management system for managing a network, the network management system including a first station having a first logic and physical addresses unique to the first station and a second station having a second logic and physical addresses unique to the second station, the first station and the second station each connected to each other via the network and each connected to a storage device, the system comprising:

means for delivering data frames to the first and second stations, each of the data frames including the first logic and physical addresses;

means for setting the first station with the first logic and physical addresses and second station with the second logic and physical addresses when the first station is in proper operational condition; and means for re-setting the second station with the first logic and physical addresses that have been assigned to the first station, so that the second station receives and processes the data frames including the first identification when the first station is about to fail;

wherein the data frames are delivered to the first and second stations through a first interface and a second interface, respectively;

the first station is set with the first identification using the first interface and the second station is set with the second identification using the second interface; and the second station is reset with the first identification using the second interface.

13. The network management system of claim 12, wherein the logical address is defined by an IP address and the physical address is defined by a MAC address.

14. The network management system of claim 12, further comprising:

means for re-setting the first station with the second logical and physical addresses that have been assigned to the second station when the first station is recovered from the failure.

15. A network management system for managing a network, the network management system including a first station having a first identification unique to the first station and a second station having a second identification unique to the second station, the first station and the second station each connected to each other via the network and each connected to a storage device, the network management system comprising:

means for delivering data frames to the first and second stations, each of the data frames containing the first identification assigned to the first station;

means for setting the first station with the first identification and the second station with the second identification when the first station is in proper operational condition; and means for, via the network, sending a data frame including the second identification that has been assigned to the second station and operational condition of the first station to the second station when the first station is about to fail; and means for, via the network, receiving the data frame including the operational condition of the first station;

means for, in response to said operational condition included in the data frame, re-setting the second station with the first identification that has been assigned to the first station, so that the second station receives, processes and stores at least some of the data frames including the first identification in the storage device;

wherein the data frames are delivered to the first and second stations through a first interface and a second interface, respectively;

the first station is set with the first identification using the first interface and the second station is set with the second identification using the second interface; and the second station is reset with the first identification using the second interface.

16. The network management system of claim 15, further comprising:

means for re-setting the first station with the identification that has been assigned to the second station when the first station is recovered from the failure.

17. A network management system for managing a network, the network management system including a first station having a first identification unique to the first station and a second station having a second identification unique to the second station, the first station and the second station each connected to each other via the network and each connected to a storage device, said system comprising:

means for connecting the first station to the network via a first link and the second station to the network via a second link;

means for delivering data frames to said first and second links, each of the data frames including the first identification;

means for setting the first station with the first identification and second station with the second identification when the first station is in proper operational condition; and means for, via the network, sending data including the second identification that has been assigned to the second station and operational condition of the first station to the second station when the first station is about to fail;

means for, via the network, receiving the data frame including the operational condition of the first station;

means for, in response to said operational condition included in the data frame, re-setting the second station with the first identification that has been assigned to the first station, so that the second station receives, processes and stores the data frames including the first identification in the storage device;

wherein, the data frames are delivered to the first and second stations through a first interface and a second interface, respectively;

the first station is set with the first identification using the first interface and the second station is set with the second identification using the second interface; and the second station is reset with the first identification using the second interface.

18. The network management system of claim 17, further comprising:

means for re-setting the first station with the second identification that has been assigned to the second station when the first station is recovered from the failure.

* * * * *